(12) United States Patent
Ishikawa (10) Patent No.: US 7,119,513 B2
(45) Date of Patent: Oct. 10, 2006

(54) CONTROL SYSTEM AND CONTROLLING METHOD FOR MOTOR DRIVE FOUR WHEEL DRIVE VEHICLE

(75) Inventor: Yasuki Ishikawa, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/970,730

(22) Filed: Oct. 22, 2004

(65) Prior Publication Data

US 2005/0134207 A1 Jun. 23, 2005

(30) Foreign Application Priority Data

Oct. 23, 2003 (JP) .............................. 2003-363191

(51) Int. Cl.
*H02P 27/04* (2006.01)

(52) U.S. Cl. ...................... 318/801; 318/151; 318/800; 318/812

(58) Field of Classification Search ................ 318/151, 318/801, 800, 812; 180/243, 65.3; 363/37; 310/46

See application file for complete search history.

(56) References Cited

U.S. PATENT DOCUMENTS 5,942,818 A * 8/1999 Satoh et al. ................... 310/46
5,988,307 A * 11/1999 Yamada et al. .............. 180/243
2003/0191576 A1 10/2003 Zarei

FOREIGN PATENT DOCUMENTS

| EP | 0 775 607 A1 | 5/1997 |
|---|---|---|
| EP | 1 085 183 A2 | 3/2001 |
| EP | 1 138 938 A2 | 10/2001 |
| FR | 2778873 A1 | 11/1999 |
| JP | 08-126117 A | 5/1996 |
| JP | 2000-168387 A | 6/2000 |
| JP | 2000-226183 A | 8/2000 |
| JP | 2002-152911 A | 5/2002 |
| JP | 2002-200932 A | 7/2002 |

* cited by examiner

*Primary Examiner*—Karen Masih
(74) *Attorney, Agent, or Firm*—Foley & Lardner LLP (57) ABSTRACT

A control system for controlling a vehicle which has an engine for driving at least one of wheels thereof and a motor for driving at least one of the rest of the wheels thereof. The control system includes: a motor generator configured to be driven by the engine for generating first alternating-current power at a first voltage; an inverter which converts the first alternating-current power to second power at a second voltage lower than the first voltage or to third direct-current power at a third voltage; and a battery to be charged with the second power supplied from the inverter. The motor is supplied with the third direct-current power at the third voltage obtained from the first alternating-current power.

6 Claims, 6 Drawing Sheets

| OPERATION MODE | 42V ALT | INVERTER | 14V BAT | SW1 | SW2 | REAR WHEEL DRIVE MOTOR | DESCRIPTION |
|---|---|---|---|---|---|---|---|
| ENGINE START-UP | MOTOR FUNCTION | POWER OPERATION | DISCHARGE | ON | OFF | NOT IN OPERATION | • FEED POWER FROM 14V BAT THROUGH INV TO 42V ALT TO START ENGINE |
| CHARGING BATTERY | POWER GENERATOR FUNCTION | REGENERATIVE OPERATION | CHARGE | ON | OFF | NOT IN OPERATION | • GENERATE POWER BY 42V ALT<br>• PUT INV IN REGENERATIVE OPERATION TO CHARGE 14V BAT |
| 4WD | POWER GENERATOR FUNCTION | REGENERATIVE OPERATION | DISCHARGE | OFF | ON | IN OPERATION | • GENERATE POWER BY 42V ALT<br>• PUT INV IN REGENERATIVE OPERATION TO FEED POWER TO REAR WHEEL DRIVE MOTOR<br>• CONTROL REAR WHEEL DRIVE MOTOR TERMINAL VOLT BY INV |

| OPERATION MODE | 42V ALT | INVERTER | 14V BAT | H BRIDGE | REAR WHEEL DRIVE MOTOR | DESCRIPTION |
|---|---|---|---|---|---|---|
| ENGINE START-UP | MOTOR FUNCTION | POWER OPERATION | CHARGE/DISCHARGE | OFF | NOT IN OPERATION | • FEED POWER FROM 14V BAT THROUGH INV TO 42V ALT TO START ENGINE |
| CHARGING BATTERY | POWER GENERATOR FUNCTION | REGENERATIVE OPERATION | CHARGE | OFF | NOT IN OPERATION | • GENERATE POWER BY 42V ALT<br>• PUT INV IN REGENERATIVE OPERATION TO CHARGE 14V BAT |
| 4WD | POWER GENERATOR FUNCTION | REGENERATIVE OPERATION | STOP CHARGING | ON | IN OPERATION | • GENERATE POWER BY 42V ALT AND CONVERT ALTERNATING CURRENT TO DIRECT CURRENT BY INV<br>• PUT H BRIDGE IN OPERATION TO FEED POWER TO REAR WHEEL DRIVE MOTOR |

# CONTROL SYSTEM AND CONTROLLING METHOD FOR MOTOR DRIVE FOUR WHEEL DRIVE VEHICLE

BACKGROUND OF THE INVENTION

1. Field of Invention

The present invention relates to a control system and a control method for controlling a four wheel drive (4WD) vehicle, in which either one of a pair of front wheels or a pair of rear wheels are driven by an engine and the other pair of wheels are driven by a motor.

2. Description of Related Art

Japanese Patent Application Laid-open Publications No. 2002-152911 and 2002-200932 disclose a 4WD vehicle in which front wheels thereof are driven by an engine and rear wheels thereof are driven by a motor. Electric power to be supplied to the motor is generated by a power generator driven by the engine.

SUMMARY OF THE INVENTION

In the above-described vehicle, the power generator for the motor is provided separately from a power generator for electric equipments of the vehicle. Accordingly, the number of parts/equipments is increased and spaces are wasted. Further, the weight and costs of the vehicle are increased.

An object of the present invention is to provide a control system and a control method for controlling a motor powered 4WD vehicle, which provide a simplified system configuration.

An aspect of the present invention is a control system for controlling a vehicle which has an engine for driving at least one of wheels thereof and a motor for driving at least one of the rest of the wheels thereof, the control system comprising: a motor generator configured to be driven by the engine for generating first alternating-current power at a first voltage; an inverter which converts the first alternating-current power to second power at a second voltage lower than the first voltage or to third direct-current power at a third voltage; and a battery to be charged with the second power supplied from the inverter, wherein the motor is supplied with the third direct-current power at the third voltage obtained from the first alternating-current power.

BRIEF DESCRIPTION OF THE DRAWINGS

The invention will now be described with reference to the accompanying drawings wherein.

DETAILED DESCRIPTION OF THE PREFERRED EMBODIMENT

Embodiments of the present invention will be explained below with reference to the drawings, wherein like members are designated by like reference characters.

Figure 1:
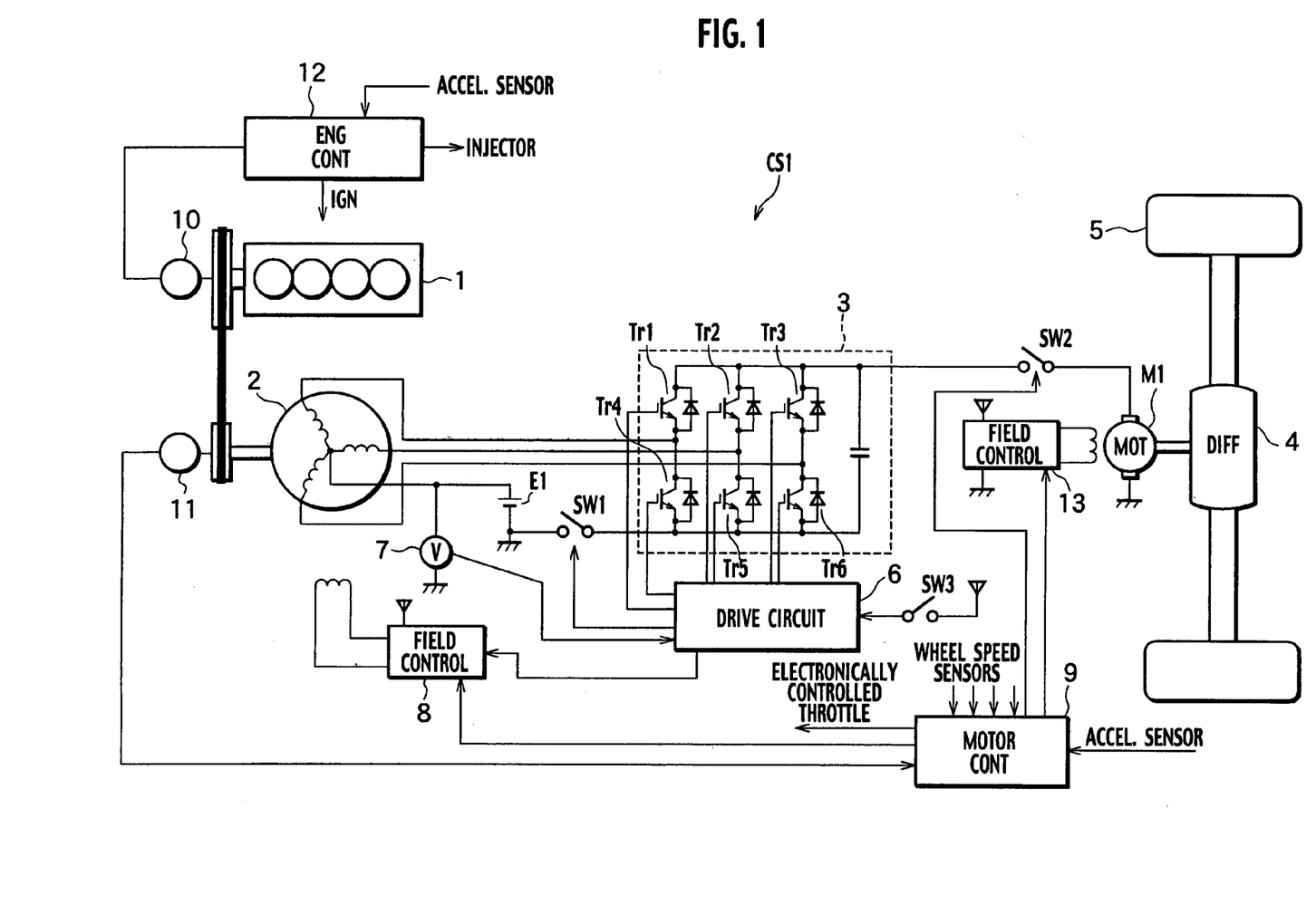
FIG. 1 is a block diagram showing a configuration of a control system for a motor powered 4WD vehicle according to a first embodiment of the present invention.

A control system CS1 according to a first embodiment of the present invention controls a vehicle, in which either one of a pair of front wheels or a pair of rear wheels are driven by an engine and the other pair of wheels are driven by a motor. As shown in FIG. 1, this system CS1 includes an engine 1, a 42-V alternator (a motor generator) 2 which is connected to the engine 1 through a belt and generates a three-phase alternating-current power at 42 V (a first rated voltage) by use of torque of the engine 1, and a 14-V battery E1 for supplying electric power to various electric devices mounted on the vehicle.

The system CS1 further includes a step-up and step-down inverter 3, and a motor M1 which is driven by direct-current power outputted from the step-up and step-down inverter 3. The step-up and step-down inverter 3 converts the three-phase alternating-current power outputted from the 42-V alternator 2 into direct-current power. Meanwhile, the step-up and step-down inverter 3 lowers the voltage of the three-phase alternating power from 42 V to 14 V (a second rated voltage), rectifies the current thereof, and supplies the rectified power to the 14-V battery E1 for charging the battery E1. Further, the step-up and step-down inverter 3 converts the direct-current power outputted from the 14-V battery E1 into three-phase alternating-current power and increase the voltage thereof, and supplies the three-phase alternating-current power to the 42-V alternator 2.

In addition, the system CS1 includes an engine controller 12, a motor controller 9 for controlling the drive of the motor M1, and a drive circuit 6 for controlling the drive of the step-up and step-down inverter 3 and of the 42-V alternator 2. The engine controller 12 outputs an ignition signal to the engine 1 and controls an injector based on a detection signal of a revolution sensor 10 provided on the engine 1 and a detection signal of an accelerator sensor (not shown).

A detection signal of a wheel speed sensor (not shown), the detection signal of the accelerator sensor, and a detection signal of a rotational position sensor 11 for detecting a rotation angle of the 42-V alternator 2 are inputted to the motor controller 9. Based on the respective detection signals, the motor controller 9 opens and closes a switch SW2 (a second switch) provided between the step-up and step-down inverter 3 and the motor M1, and also outputs a control signal to a field controller 13 for controlling a field current of the motor M1 (a current flowing in a field coil).

An output shaft of the motor M1 is connected to rear wheels 5 through a differential 4. Here, an example of driving the rear wheels 5 with the motor M1 will be explained. However, when driving the rear wheels 5 with the engine power, the motor M1 drives front wheels instead.

The 42-V alternator 2 is provided with a field controller 8 for controlling a field current of the 42-V alternator 2. This field controller 8 is operated under control of the drive circuit 6 and the motor controller 9.

The step-up and step-down inverter 3 includes six switching elements Tr1 to Tr6 of insulated gate bipolar transistors (IGBTs), metal oxide semiconductor field effect transistors (MOS-FETs), or the like. A ground terminal of the step-up and step-down inverter 3 is connected to a negative terminal of the 14-V battery E1 through a switch SW1 (a first switch) and is then connected to ground.

A positive terminal of the 14-V battery E1 is connected to a neutral point of three-phase field coils of the 42-V alternator 2. A voltage sensor 7 is provided for measuring the charging voltage of the 14-V battery E1.

An operation signal of an accelerator switch SW3 and a detection signal of the voltage sensor 7 are inputted to the drive circuit 6. Upon receipt of these signals, the drive circuit 6 outputs driving signals to control input terminals of the six switching elements Tr1 to Tr6 included in the step-up and step-down inverter 3. Further, the drive circuit 6 outputs a control signal for opening and closing the switch SW1.

In the system CS1, by allowing the step-up and step-down inverter 3 to perform a powering operation while the switch SW1 is turned on (closed) and the switch SW2 is turned off (open) under control of the drive circuit 6 and the motor controller 9, it is possible to convert the direct-current power discharged from the 14-V battery E1 into the three-phase alternating-current power, to use the 42-V alternator 2 as an electric motor, feeding this three-phase alternating-current power, and thereby to start the engine 1. Meanwhile, by allowing the step-up and step-down inverter 3 to perform a regenerative operation, using the 42-V alternator 2 as a power generator, it is possible to rectify the three-phase alternating-current power generated by the 42-V alternator 2 and lower the voltage thereof, thereby to charge the 14-V battery E1. In addition, by allowing the step-up and step-down inverter 3 to perform a regenerative operation while turning the switch SW1 off and turning the switch SW2 on, it is possible to power the motor M1 and allow the vehicle to perform 4WD drive.

Figure 5:
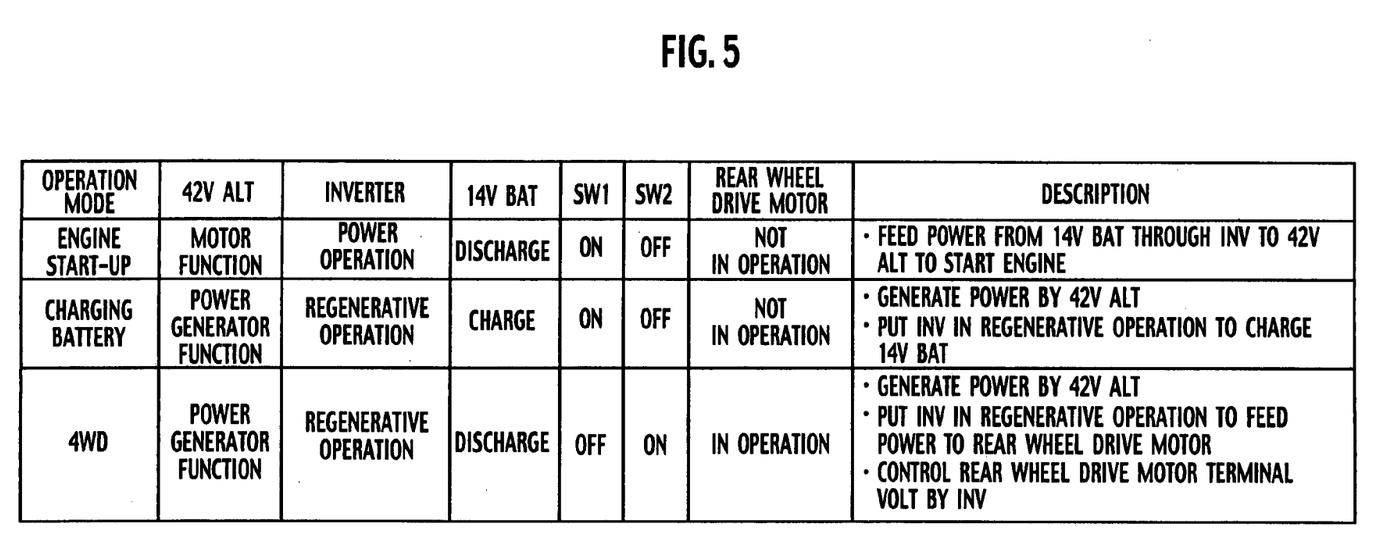
FIG. 5 is a table for describing operation states of respective devices in the control system for a motor powered 4WD vehicle according to the first embodiment.

Next, operations of the control system CS1 will be described in terms of (A) starting the engine, (B) charging the 14-V battery, and (C) driving in 4WD mode, respectively. Here, actions of the 42-V alternator 2, the step-up and step-down inverter 3, the 14-V battery E1, the switches SW1 and SW2, and the motor M1 in the respective operations are as shown in FIG. 5.

(A) Operation When Starting the Engine

Figure 2:
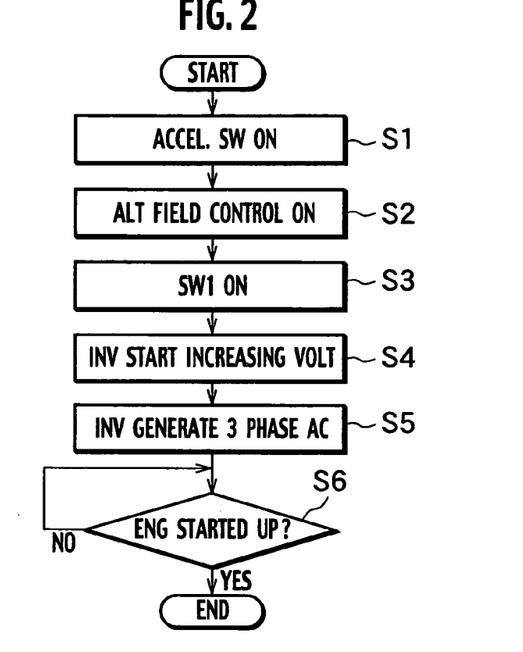
FIG. 2 is a flowchart showing an operation of the control system for a motor powered 4WD vehicle according to the first embodiment when starting an engine.

FIG. 2 is a flowchart showing a process operation when starting the engine. Firstly, when the accelerator switch is turned on in Step S1, an instruction signal is outputted to the field controller 8 under control of the drive circuit 6 to apply a field current thereto. In this way, the field current of the 42-V alternator 2 becomes controllable in Step S2.

Thereafter, the switch SW1 is turned on in Step S3. In this way, an output voltage (14 V at the maximum) from the 14-V battery E1 is applied to the neutral point of the 42-V alternator 2. Further, in Step S4, the drive circuit 6 controls output signals to the control input terminals of the switching elements Tr1 to Tr6 in the step-up and step-down inverter 3, and thereby controls on and off states of these switching elements Tr1 to Tr6. In Step S5, the drive circuit 6 causes the step-up and step-down inverter 3 to generate the three-phase alternating-current power (approximately 1 kW (kilowatts) at the maximum) from the power supplied from the battery E1 (approximately 1 kW at the maximum) while increasing the voltage thereof to approximately 20 Vrms (root mean squared voltage).

The generated three-phase alternating-current power is applied to the 42-V alternator 2. Accordingly, a shaft of the 42-V alternator 2 rotates as the electric motor and cranks the engine 1. Simultaneously, the engine controller 12 outputs the ignition signal to the engine 1 and outputs a fuel injection signal to the injector. Accordingly, the engine 1 is started in Step S6.

(B) Operation When Charging the Battery

Figure 3:
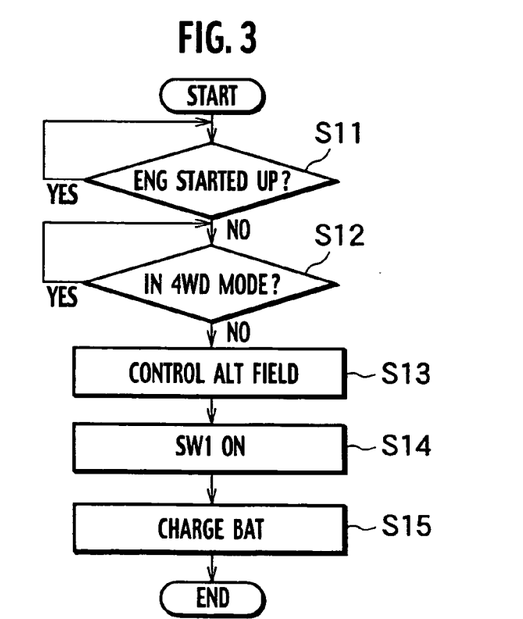
FIG. 3 is a flowchart showing an operation of the control system for a motor powered 4WD vehicle according to the first embodiment when charging a battery.

Next, an operation when charging the 14-V battery E1 will be described with reference to a flowchart shown in FIG. 3, In Step S11, the drive circuit 6 determines whether or not the engine 1 is started. When the engine 1 is started, in Step S12, the motor controller 9 determines whether or not the vehicle is in 4WD mode, or in other words, whether the motor M1 is in operation and the switch SW2 is turned on.

Meanwhile, when the vehicle is in 4WD mode, in Step S13, the motor controller 9 outputs the control signal to the field controller 8 and thereby controls the field current of the 42-V alternator 2.

Thereafter, the switch SW1 is turned on in Step S14. In this way, the 42-V alternator 2 functions as a power generator and the step-up and step-down inverter 3 performs the regenerative operation. Accordingly, the alternating-current power (approximately 4 kW at the maximum) generated by the 42-V alternator 2 is rectified, and the voltage thereof (11 to 42 Vrms) is lowered by controlling the on and off states of the respective switching elements Tr1 to Tr6. In Step S15, the 14-V battery E1 is charged with the direct-current power (approximately 1 kW at the maximum) at an appropriate charging voltage (14 V) adjusted based on the detection signal of the voltage sensor 7.

In this embodiment, the 14-V battery E1 is connected between a negative bus of the step-up and step-down inverter 3 and the neutral point of the 42-V alternator 2. In this way, a zero-phase voltage is applied to the inverter output voltage, which increases the voltage of the direct-current power formed by the inverter.

(C) Operation in 4WD Mode

Figure 4:
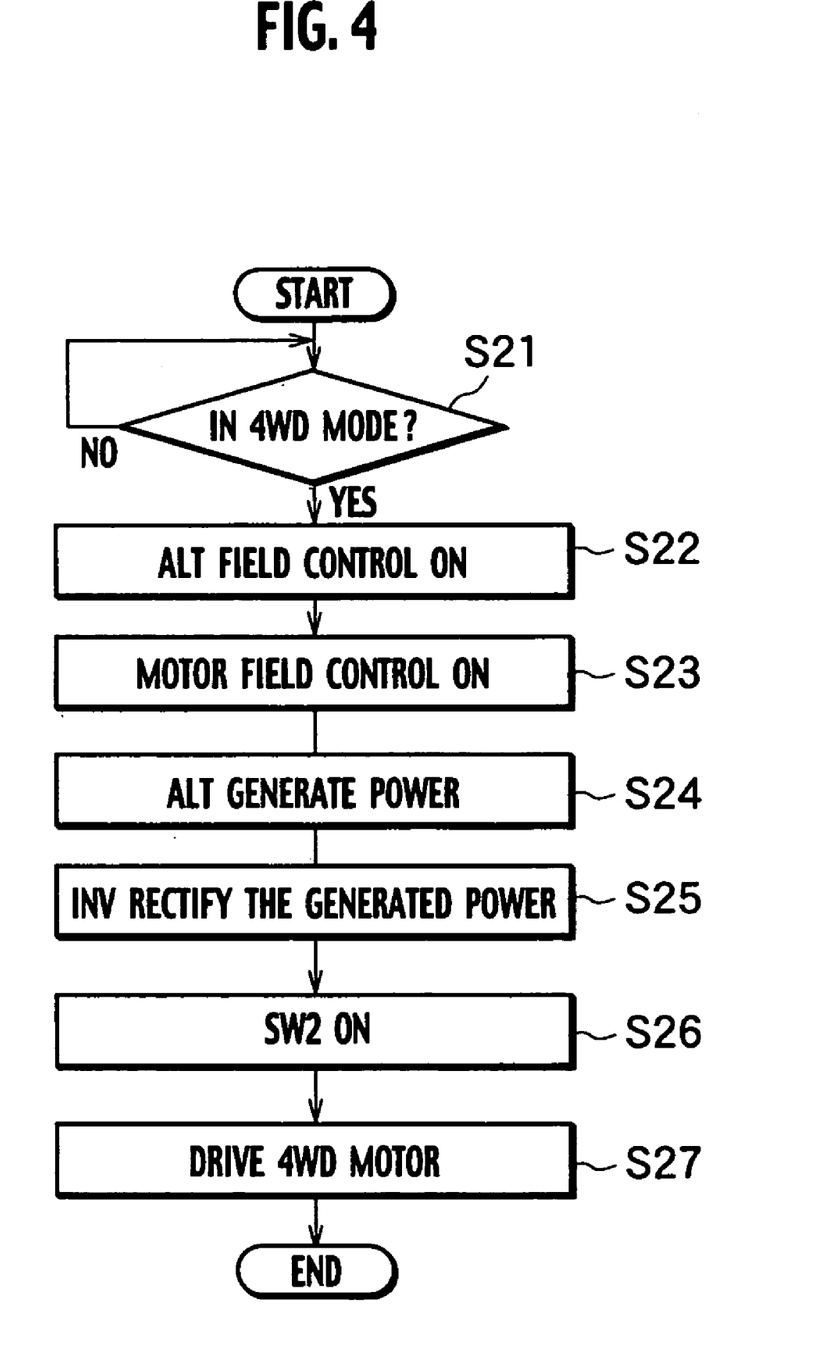
FIG. 4 is a flowchart showing an operation of the control system for a motor powered 4WD vehicle according to the first embodiment when driving a motor.

Next, an operation in the 4WD mode will be described with reference to a flowchart shown in FIG. 4. Firstly, in Step S21, the motor controller 9 determines whether or not the 4WD drive is to be performed based on the detection signal of the wheel speed sensor and on the detection signal of the accelerator sensor, When performing the 4WD drive, in Step S22, the drive circuit 6 outputs an instruction signal to the field controller 8 to apply a field current thereto. In this way, the field current of the 42-V alternator 2 becomes controllable.

Further, in Step S23, the motor controller 9 outputs another instruction signal to the field controller 13 to apply a field current thereto. In this way, the field current of the motor M1 becomes controllable. Then, in Step S24, the 42-V alternator 2's shaft is rotated by use of the torque of the engine 1 and is thereby operated as the power generator. In Step S25, the three-phase alternating-current power (approximately 4 kW at the maximum) generated by the 42-V alternator 2 is rectified by the step-up and step-down inverter 3.

At this time, in Step S26, the switch SW2 is turned on under control of the motor controller 9. Accordingly, the direct-current power (approximately 4 kW at the maximum) at a voltage of 16 to 60 V obtained by the rectification of the step-up and step-down inverter 3 is applied to the motor M1 and a shaft of the motor M1 is thereby rotated. The 4WD drive is thus achieved in which the front wheels are driven by the engine 1 and the rear wheels are driven by the motor M1.

As described above, in the control system CS1, when the engine 1 is running, it is possible to rectify the electric power generated by the 42-V alternator 2, lowering the voltage thereof, and thereby to charge the 14-V battery E1. Moreover, in the 4WD mode, it is possible to rectify the three-phase alternating-current power generated by the 42-V alternator 2 and to supply the power to the motor M1. Therefore, the single inverter can serve as the inverter for charging the 14-V battery E1 and as the inverter for feeding power to the motor M1. Accordingly, it is possible to simplify a system configuration.

In other words, the single motor generator (the 42-V alternator 2) can supply the electric power to the motor and the battery having mutually different rated voltages respectively. Accordingly, it is possible to provide flexibility in layout, and to reduce weight and cost.

Meanwhile, when starting the engine 1, it is possible to drive the 42-V alternator 2 by converting the power discharged from the 14-V battery E1 into three-phase alternating power by use of the step-up and step-down inverter 3, and feeding the three-phase alternating power to the 42-V alternator 2 for starting the engine 1. Accordingly, no other power source is required to start the engine 1. In this way, it is possible to simplify the system configuration.

In other words, when starting the engine, it is possible to convert the power discharged from the battery into the three-phase alternating-current power at the first rated voltage by use of the step-up and step-down inverter, to rotate a shaft of the motor generator feeding the three-phase current power thereto, and thereby to start the engine. Accordingly, no other power source is required to start the engine. In this way, it is possible to simplify the system configuration.

Moreover, the 42-V alternator 2's shaft is rotated and the engine 1 is started when the accelerator switch SW3 is turned on. Accordingly, it is possible to realize an idle stop operation in which the engine is temporarily stopped only while the vehicle is not in motion, thereby improving gas mileage, In other words, the engine is started when the accelerator switch for detecting an accelerating operation is turned on. Accordingly, it is possible to realize the idle stop operation, thereby improving gas mileage.

Meanwhile, the start of the engine 1 and the charge of the 14-V battery E1, and the drive of the motor M1 are switched by changing the on (closed) and off (open) states of the switch SW1 and the switch SW2. Accordingly, when starting the engine 1 or charging the 14-V battery E1, it is possible to ensure disconnection between the motor M1 and the step-up and step-down inverter 3 by turning the switch SW2 off. When driving the motor M1, it is possible to ensure disconnection between the 14-V battery E1 and the step-up and step-down inverter 3. Therefore, it is possible to prevent malfunction and improve operability.

In other words, by changing the open state and the closed state of the first and second switches, it is possible to ensure disconnection between the motor and the step-up and step-down inverter when starting the engine or charging the battery. Meanwhile, it is possible to ensure disconnection between the battery and the step-up and step-down inverter when driving the motor. Therefore, it is possible to prevent malfunction and to improve operability.

Figure 6:
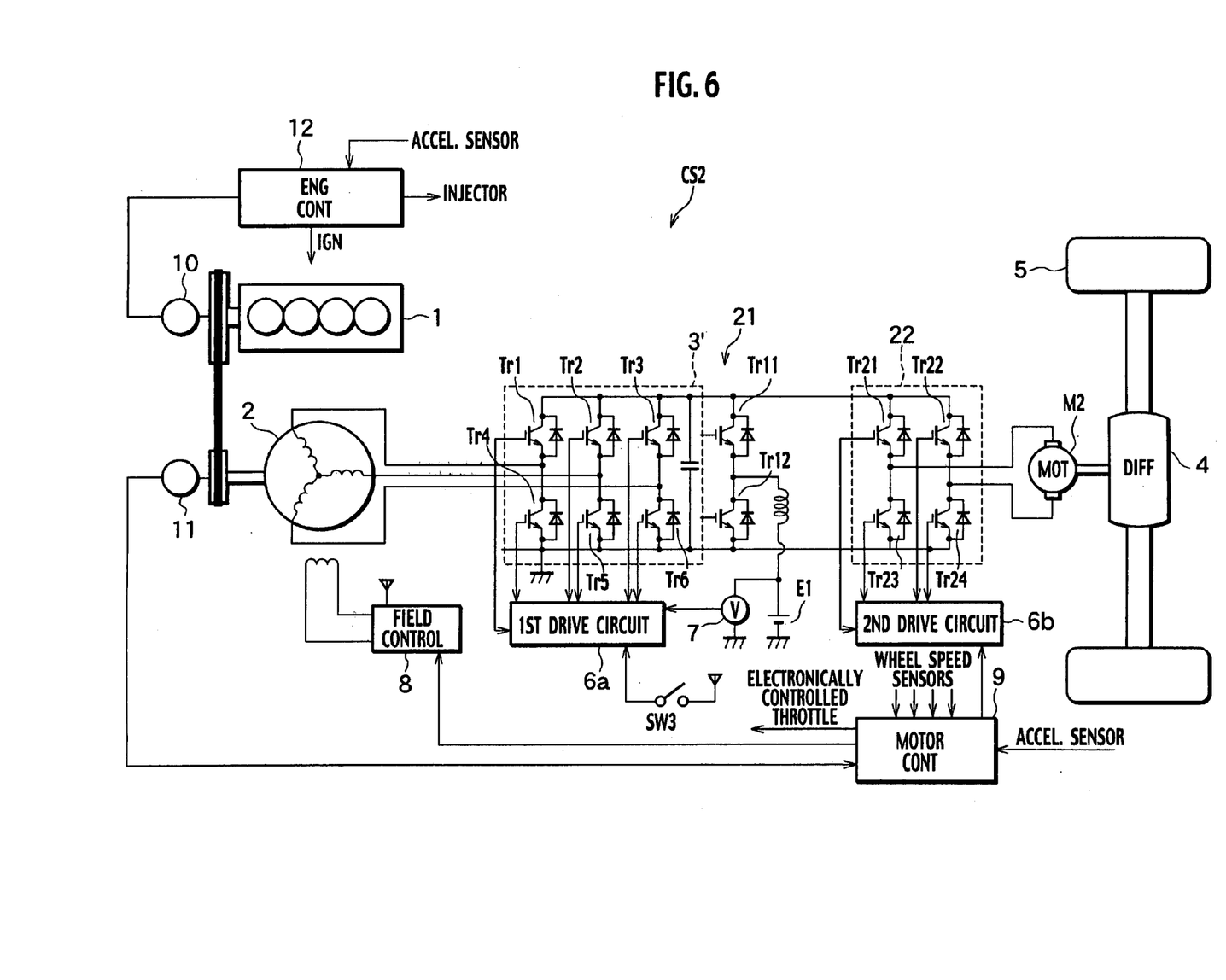
FIG. 6 is a block diagram showing a configuration of a control system for a motor powered 4WD vehicle according to a second embodiment of the present invention.

FIG. 6 is a block diagram showing a control system CS2 for a motor powered 4WD vehicle according to a second embodiment of the present invention. As shown in the drawing, the control system CS2 includes the engine 1, the 42-V alternator (the motor generator) 2, the 14-V battery E1, the motor controller 9, the field controller 8, the engine controller 12, the revolution sensor 10, the rotational position sensor 11, and the voltage sensor 7 as similar to the above-described first embodiment. The control system CS2 further includes an inverter 3'.

In the system CS2, a DC-DC converter 21 having two switching elements Tr11 and Tr12 is provided at a subsequent stage to the inverter 3'. An output terminal of the DC-DC converter 21 is connected to the 14-V battery E1. The system CS2 includes a first drive circuit 6a for controlling the inverter 3' and the DC-DC converter 21 based on the detection signal of the voltage sensor 7 and on the detection signal of the accelerator switch SW3.

The inverter 3' does not have a function to lower or increase the voltage. Instead, the DC-DC converter 21 lowers the voltage of the direct-current power outputted from the inverter 3', and supplies the power to the 14-V battery E1. That is, the inverter 3' and the DC-DC converter 21 collectively constitute a step-up and step-down inverter. Moreover, the DC-DC converter 21 increases the voltage of the power discharged from the 14-V battery E1, and applies the power to the inverter 3'.

Further, an H-bridge circuit 22 and a second drive circuit 6b for controlling the drive of this H-bridge circuit 22 are provided at a subsequent stage to the inverter 3'. The H-bridge circuit 22 includes four switching elements Tr21 to Tr24. By turning these switching elements Tr21 to Tr24 on and off, it is possible to control driving or stopping, and a direction of rotation of a permanent magnet direct-current motor M2, which is provided at a subsequent stage to the H-bridge circuit 22.

Here, the motor M2 is connected to the rear wheels 5 through the differential 4 as similar to the above-described first embodiment.

Figure 7:
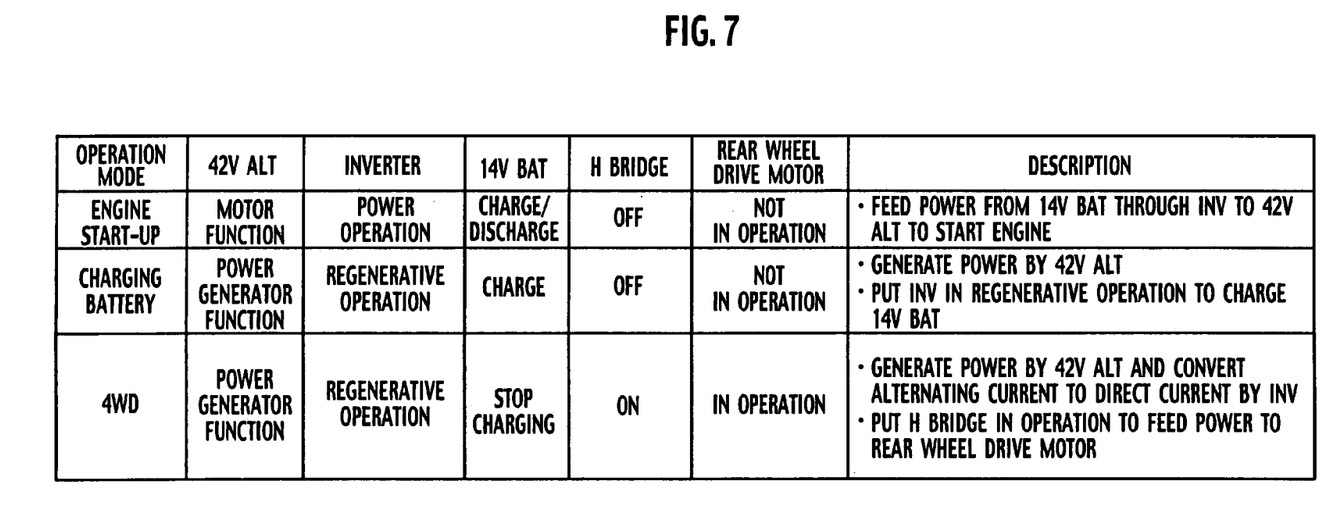
FIG. 7 is a table for describing operation states of respective devices in the control system for a motor powered 4WD vehicle according to the second embodiment.

Next, operations of the control system CS2 will be described. Here, actions of the 42-V alternator 2, the inverter 3', the 14-V battery E1, the H-bridge circuit 22, and the motor M2 when starting the engine, charging the battery, and in the 4WD mode, are shown as indicated in FIG. 7.

Firstly, the first drive circuit 6a operates to start the engine 1 when detecting that the accelerator switch SW3 is turned on. When starting the engine 1, the electric power of the 14-V battery E1 is applied to the inverter 3'. Then, the electric power is converted into the three-phase alternating-current power by the inverter 3', and the power is applied to the 42-V alternator 2. In this way, the 42-V alternator 2's shaft is rotated and the engine 1 is started.

Meanwhile, when the engine 1 is running, the electric power generated by the 42-V alternator 2 is rectified by the inverter 3', converted into a power at a predetermined voltage by the DC-DC converter 21, and then supplied to the 14-V battery E1 for charging the 14-V battery E1.

Moreover, when driving the motor M2, the three-phase alternating-current power generated by the 42-V alternator 2 is supplied to the inverter 3'. The inverter 3' performs the regenerative operation, whereby the power is supplied to the. H-bridge circuit 22. Then, the respective switching elements Tr21 to Tr24 in the H-bridge circuit 22 are turned on and off under the control of the second drive circuit 6b. Accordingly, driving power is applied to the motor M2 and the motor M2 is thereby driven.

As described above, in the control system CS2 for a motor powered 4WD vehicle according to the second embodiment, as similar to the first embodiment, when the engine 1 is running, it is possible to rectify the electric power generated by the 42-V alternator 2 and lower the voltage thereof, and thereby to charge the 14-V battery E1. Moreover, in the 4WD mode, it is possible to rectify the three-phase alternating-current power generated by the 42-V alternator 2 and to supply the power to the motor M2. Therefore, the single inverter can serve as the inverter for charging the 14-V battery E1 and as the inverter for driving the motor M2. Accordingly, it is possible to simplify a system configuration.

Meanwhile, when starting the engine 1, it is possible to drive the 42-V alternator 2 by converting the power discharged from the 14-V battery E1 into the three-phase alternating-current power by use of the DC-DC converter 21 and the inverter 3', feeding the three-phase alternating-current power to the 42-V alternator 2, and thereby to start the engine 1. Accordingly, no other power source is required to start the engine 1. In this way, it is possible to simplify the system configuration.

Moreover, the 42-V alternator 2's shaft is rotated and the engine 1 is started when the accelerator switch SW3 is turned on. Accordingly, it is possible to realize the idle stop operation, thereby improving gas mileage.

Furthermore, the voltage of the direct-current power outputted from the inverter 3' is lowered by the DC-DC converter 21 to the voltage (the second rated voltage) suitable for charging the 14-V battery E1; meanwhile, the voltage of the power discharged from the 14-V battery E1 is increased by the DC-DC converter 21 and the electric power for starting the engine 1 is thereby outputted to the inverter 3'. Accordingly, a conventional inverter can be used as the inverter 3'. As a result, it is possible to lower the number of different parts/devices. Such limitation is extremely advantageous when constructing circuits.

The preferred embodiments described herein are illustrative and not restrictive, and the invention may be practiced or embodied in other ways without departing from the spirit or essential character thereof. The scope of the invention being indicated by the claims, and all variations which come within the meaning according to claims are intended to be embraced herein.

The present disclosure relates to subject matters contained in Japanese Patent Application No. 2003-363191, filed on Oct. 23, 2003, the disclosure of which is expressly incorporated herein by reference in its entirety.

What is claimed is:

1. A control system for controlling a vehicle which has an engine for driving at least one of wheels thereof and a motor for driving at least one of the rest of the wheels thereof, the control system comprising:
    a motor generator configured to be driven by the engine for generating first alternating-current power at a first voltage;
    an inverter which converts the first alternating-current power to second power at a second voltage lower than the first voltage or to third direct-current power at a third voltage different from the second voltage; and
    a battery to be charged with the second power supplied from the inverter,
    wherein the motor is supplied with the third direct-current power at the third voltage obtained from the first alternating-current power.

2. A control system for controlling a vehicle which has an engine for driving at least one of wheels thereof and a motor for driving at least one of the rest of the wheels thereof, the control system comprising:
    a motor generator configured to be driven by the engine for generating first alternating-current power at a first voltage;
    an inverter which converts the first alternating-current power to second power at a second voltage lower than the first voltage or to third direct-current power at a third voltage; and
    a battery to be charged with the second power supplied from the inverter,
    wherein the motor is supplied with the third direct-current power at the third voltage obtained from the first alternating-current power, and wherein
    the inverter is supplied with fourth power at a fourth voltage discharged from the battery and converts the fourth power to fifth power at a fifth voltage, and the motor generator is supplied with the fifth power and generates driving force for starting the engine.

3. The control system according to claim 1, wherein the engine is started when an operation of an accelerator is detected.

4. The control system according to claim 1, wherein the second power is direct-current power.

5. A control system for controlling a vehicle which has an engine for driving at least one of wheels thereof and a motor for driving at least one of the rest of the wheels thereof, the control system comprising:
    a motor generator configured to be driven by the engine for generating first alternating-current power at a first voltage;
    an inverter which converts the first alternating-current power to second power at a second voltage lower than the first voltage or to third direct-current power at a third voltage;
    a battery to be charged with the second power supplied from the inverter;
    a first switch for changing electrical connection between the inverter and the battery; and
    a second switch for changing electrical connection between the inverter and the motor, wherein the motor is supplied with the third direct-current power at the third voltage obtained from the first alternating-current power, and wherein,
    when starting the engine, the first switch is closed and the second switch is opened, so that electricity can be supplied from the battery to the inverter,
    when charging the battery, the first switch is closed and the second switch is opened, so that electricity can be supplied from the inverter to the battery, and
    when driving the motor, the first switch is opened and the second switch is closed, so that electricity can be supplied from the inverter to the motor.

6. A method of controlling a vehicle which has an engine for driving at least one of wheels thereof and a motor for driving at least one of the rest of the wheels thereof, the method comprising:
    converting first alternating-current power at a first voltage generated by the motor generator to second direct-current power at a second voltage lower than the first voltage, supplying the second direct-current power to a battery for charging the battery;
    rectifying the first alternating-current power generated by the motor generator to obtain third direct-current power at a third voltage, supplying the third direct-current power to the motor for driving the motor; and
    converting fourth electric power at a fourth voltage discharged from a battery to fifth alternating-current power at a fifth voltage, supplying the fifth alternating-current power to a motor generator, starting the engine with driving force of the motor generator.

\* \* \* \* \*